Patented Mar. 1, 1932

1,847,599

UNITED STATES PATENT OFFICE

ROBERT A. DUNHAM, OF LONG BEACH, CALIFORNIA, ASSIGNOR TO UNION OIL COMPANY OF CALIFORNIA, OF LOS ANGELES, CALIFORNIA, A CORPORATION OF CALIFORNIA

METHOD FOR DEVULCANIZING AND RECLAIMING RUBBER AND PRODUCT THEREOF

No Drawing. Application filed October 17, 1928, Serial No. 313,180. Renewed August 4, 1930.

This invention relates to the reclamation of vulcanized rubber and to the reclaimed product.

Fundamentally the object of the invention is to obtain a reclaimed rubber which is far superior to reclaimed rubber products obtained by methods known heretofore, and to present a reclaimed product having characteristics closely approximating those of the original rubber or rubber mixture used in the original goods before vulcanization.

It has been the common practice in the reclamation of rubber to shred or grind the entire body from which rubber is to be recovered, to treat the mass for the separation of fiber and then to recover the rubber from the mass. But the recovered rubber as obtained by these processes has been of poor quality and has never even closely approximated the original rubber mass as used in the goods before vulcanization.

I have discovered that vulcanized rubber can be devulcanized and dissolved by a solvent known as Edeleanu extract obtained in the treatment of petroleum distillates. This extract is a by-product obtained in the refining of petroleum distillates by extraction with liquid sulfur di-oxide, this treatment being commonly known as the Edeleanu process. When a petroleum distillate is extracted with said liquid sulfur di-oxide complex nitrogen and sulfur bodies, aromatic hydrocarbons and unsaturated hydrocarbons are removed from the oil by the liquid sulfur di-oxide, and upon evaporation of the liquid sulfur di-oxide these bodies remain behind in the form of a liquid known as Edeleanu extract. It is this extract which I have found to be a solvent and a devulcanizing agent for vulcanized rubber.

Upon treatment of vulcanized rubber with said extract at a suitable temperature devulcanization takes place, i. e. the rubber loses its coherence so that it can be reduced by slight mechanical working to a liquid condition such that the solution is capable of being filtered or centrifuged. When the solution is filtered it carries with it through the filtering medium finely divided or colloidal fillers such as carbon black and zinc oxide so that when the rubber is removed these fillers come out with it thus yielding an unvulcanized rubber containing fillers and suitable for reuse. Except for coarse fillers removed by the filtering step, the resulting rubber mass is of substantially the same consistency as the rubber mixture originally employed in the goods now being reclaimed. If the rubber employed in these goods was a good grade of raw rubber having high tensile strength and marked cohesiveness, the reclaimed products will be of similar quality. Of course, if the original rubber mixture was itself a reclaimed rubber of bad quality with an excess amount of filler or coloring matter the product reclaimed by the present process will approach only the character of the poor rubber mass originally used.

Therefore, broadly stated, the present invention comprises the treatment of the vulcanized rubber by said Edeleanu extract under proper conditions of heat to devulcanize and dissolve the old vulcanized rubber, thereby bringing the rubber into the form of a solution capable of being filtered or centrifuged. The invention also lies in the reclaimed rubber product having physical characteristics closely approximating those of the rubber mass used in the original manufacture of the goods being reclaimed.

Considering the process in greater detail I obtain an Edeleanu extract from the treatment of petroleum distillates as above defined, and introduce into it old vulcanized rubber or vulcanized rubber goods and digest the same in said extract at about 340° F. preferably under a reflux condenser and under pressure if required until the rubber material has lost its coherence. The rubber goods so introduced into the extract may be whole, but preferably will be cut into pieces or chunks of convenient size. Shredding or grinding is avoided, and fabric, cords and other materials found in the old goods are thereby left in pieces of appreciable size to facilitate their subsequent removal from the solution. Digestion may be carried on either at atmospheric pressure or at higher pressures as advantageous or desirable. When the rubber mass has lost its coherence, the mixture is then worked or agitated so as to cause liquefaction of the rubber and liberation of the same from coarse foreign matter such as metal, fabric, cords and cellulose fibers, care being taken to avoid comminution of the latter. The material thus thoroughly digested to bring the rubber into solution, may be passed through a filter or a centrifuge to remove all said coarse foreign matter, the rubber solution easily passing the filter or centrifuge and carrying with it the finely divided filler or compounding materials which are thereby found in the filtrate. According to a preferred method of operation, the mass will be first centrifugally extracted through a filter medium such as a screen basket, washed on the screen with Edeleanu extract, and then subjected to pressure filtering through a cloth or the like to remove all fibers. The filtrate obtained by any of those methods may be freely diluted with any of the common solvents for raw rubber.

Said filtrate may be used directly as a rubber cement or as an addition to a new rubber cement for the manufacture of rubber dip goods, or it may be added as a plasticizer to new rubber being milled. Also the rubber may be extracted from the solvent by means of any precipitating or selective extraction agent which is miscible with the solvent but is itself a non-solvent for the rubber. A good example of such an agent is acetone which throws down the rubber mass readily. Alcohols, especially anhydrous alcohols, also may be used for this purpose. It is also feasible to remove the solvent from the rubber by distilling or evaporating, excess temperatures being avoided if necessary, by use of vacuum or steam, or both. Also currents of air or gas may be employed. The rubber so recovered, if reclaimed from goods in which a good grade of rubber was originally used, will be a pasty mass closely resembling compounded milled rubber and having a high order of cohesiveness and tensile strength.

This reclaimed rubber is now soluble in any of the common solvents for raw rubber and from it goods may be manufactured by any desired method.

From the foregoing it will be clear that the treatment of rubber with Edeleanu extract results in devulcanization and solution of said rubber. Devulcanization takes place at a temperature somewhat above 325° F., e. g. 340° F., the rubber being readily disintegrated and dispersed in the solvent without appreciable disintegration of the coarse foreign bodies. New goods made up from the rubber so reclaimed are then easily vulcanized at temperatures commonly used for vulcanization of virgin rubber, except that if a material amount of the Edeleanu extract remains in the rubber mass, the vulcanization temperature must be controlled so as not to exceed 325° F., otherwise a cure will not result because of the devulcanization tendency of the extract above such temperature.

As a specific example of one method of carrying on the reclaiming step, an Edeleanu extract obtained from the refining of kerosene distillate from a California stock by extraction with liquid sulfur dioxide according to the well known Edeleanu process, was employed. An old inner tube for automobile tires was cut into pieces and digested in the extract for a period of six hours at 350° F. thereby devulcanizing and dissolving all the rubber. The resulting mass was then filtered and the zinc oxide filler passed through with the rubber solution. In a second instance, an old tire casing was cut into chunks and digested in Edeleanu extract for a period of twelve hours at 350° F. with the result that the rubber was devulcanized and softened to such an extent that when the mass was put through a picker the cords and cellulose readily separated, and the rubber readily dispersed in the solvent extract. The mixture of cellulose fragments and rubber solution was then passed to a basket centrifuge in which the major portion of the cellulose was separated. The solution was then pumped through a pressure filter thereby separating the remainder of the cellulose and yielding a solution of rubber containing the finely divided filler.

The rubber in each instance was precipitated from the filtrate by the introduction of acetone, the filler which had remained in suspension in the solution, being brought down with the rubber. The resulting rubber mass possessed great adhesive properties, cohesiveness and tensile strength, closely approximating that of the rubber mass as used in production of the original goods.

Besides Edeleanu extract other petroleum fractions and fractions of other oils such as shale oils, tar oil and coal tars and oils may be used, when such fractions correspond generally in character to the Edeleanu extract, i. e. when they contain unsaturated and aromatic hydrocarbons and nitrogen and sulfur bodies and are soluble in liquid $SO_2$.

As an example of said other fractions, acid sludge oil from petroleum treatment, may be taken. Acid sludge oil is recovered from acid sludge which is obtained from the treatment of various petroleum fractions (e. g. kerosene) with sulfuric acid. By hydrolyzing the sludge as with steam the sludge separates into two layers, one of which is a solution of sulfuric acid and the other of which is known as "sludge oil" and is the acid sludge oil here designated. The treatment of the rubber goods with these agents is essentially the same as with Edeleanu extract as above described, and the rubber solution and reclaimed rubber obtained have the same general characteristics. The invention, therefore, resides also in the treatment of waste or vulcanized rubber goods with solvents obtained in general as fractions largely soluble in liquid $SO_2$ and especially such fractions containing relatively large proportions of unsaturated and aromatic hydrocarbons and nitrogen and sulfur bodies.

It is clear, therefore, that I have discovered a new process for reclaiming rubber, a process for producing an exceptionally high grade of reclaimed rubber, a new process for devulcanizing rubber, and a reclaimed rubber having valuable properties heretofore unknown in reclaimed stock.

It is to be understood that wherever the term "Edeleanu extract" is used, it is intended to cover any fraction distilled from said extract and having the required properties. For example, in some instances it may be desirable to use an agent more volatile than the original Edeleanu extract, and such agent may be readily obtained by distillation of the extract.

Similarly wherever the term "sludge oil" is employed, it is intended that the expression shall include any sludge oil fraction having the necessary characteristics as above indicated. This is particularly true where the sludge oil itself is too heavy to be suitable for the required purpose. In such case a lighter desirable fraction can be obtained by distillation.

I claim:

1. A rubber body obtained from a mixture of rubber and a kerosene fraction containing a major portion of nitrogen and sulfur compounds and unsaturated and aromatic compounds.

2. A method for preparing rubber comprising treating the same with an agent largely soluble in liquid sulfur dioxide and containing nitrogen and sulfur compounds and unsaturated and aromatic compounds.

3. A rubber containing an agent largely soluble in sulfur dioxide and containing nitrogen and sulfur compounds and unsaturated and aromatic compounds.

4. A rubber containing a petroleum fraction largely soluble in liquid sulfur dioxide.

5. A method for preparing rubber comprising treating the same with a petroleum fraction largely soluble in liquid sulfur dioxide.

6. A rubber containing sludge oil.

7. A method for preparing rubber comprising treating the same with a sludge oil.

8. A rubber containing Edeleanu extract.

9. A method for preparing rubber comprising treating the same with Edeleanu extract.

10. A rubber body containing Edeleanu extract obtained from a California kerosene.

11. A method for reclaiming rubber comprising digesting the rubber with a petroleum fraction soluble in liquid sulfur dioxide.

12. A method for reclaiming rubber comprising treating the rubber with a petroleum fraction from an asphaltic base stock, said fraction being soluble in liquid sulfur dioxide.

13. A devulcanized rubber containing sludge oil.

14. A devulcanized rubber containing a petroleum fraction largely soluble in sulfur dioxide.

15. A method for devulcanizing vulcanized rubber comprising heating the vulcanized rubber with sludge oil at a sufficient temperature and for a time sufficient to cause devulcanization.

16. A method of forming rubber goods from old rubber, comprising the steps of digesting vulcanized rubber with sludge oil at a temperature above approximately 325° F. until a solution of the rubber is formed, obtaining rubber from said solution in the form of an article and vulcanizing the article at a temperature somewhat below a temperature approximating 325° F.

17. A method for devulcanizing vulcanized rubber, comprising treating vulcanized rubber with Edeleanu extract at a sufficient temperature and for a time sufficient to cause devulcanization.

18. A method for devulcanizing vulcanized rubber, comprising digesting the vulcanized rubber with Edeleanu extract at a temperature above 325° F. until devulcanization takes place.

19. A method for reclaiming vulcanized rubber comprising the step of digesting the vulcanized rubber with Edeleanu extract to dissolve the rubber.

20. A method of forming rubber goods from old rubber, comprising the steps of digesting vulcanized rubber with Edeleanu extract at a temperature above approximately 325° F. until a solution of the rubber is formed, obtaining rubber from said solution in the form of an article, and vulcanizing the article at a temperature somewhat below a temperature approximating 325° F.

21. A method for devulcanizing vulcanized rubber, comprising treating vulcanized rubber with a petroleum fraction largely soluble in liquid sulfur dioxide at a sufficient temperature and for a time sufficient to cause devulcanization.

22. A method for devulcanizing vulcanized rubber, comprising digesting the vulcanized rubber with a petroleum fraction largely soluble in liquid sulfur dioxide at a temperature above 325° F. until devulcanization takes place.

23. A method of forming rubber goods from old rubber, comprising the steps of digesting vulcanized rubber with a petroleum fraction largely soluble in liquid sulfur dioxide at a temperature above approximately 325° F. until devulcanization takes place, obtaining the devulcanized rubber in the form of an article, and vulcanizing the article at a temperature somewhat below a temperature approximating 325° F.

Signed at Wilmington, in the county of Los Angeles and State of California, this 11th day of October, A. D. 1928.

ROBERT A. DUNHAM.